(12) United States Patent
Hardman

(10) Patent No.: US 7,398,365 B1
(45) Date of Patent: Jul. 8, 2008

(54) RESTORING DATA WITH REDUCED SUSPENSION-OF-ACCESS PERIODS

(75) Inventor: Daniel H. Hardman, American Fork, UT (US)

(73) Assignee: Symantec Corporation, Cupertino, CA (US)

( * ) Notice: Subject to any disclaimer, the term of this patent is extended or adjusted under 35 U.S.C. 154(b) by 308 days.

(21) Appl. No.: 11/180,402

(22) Filed: Jul. 13, 2005

(51) Int. Cl.
*G06F 12/16* (2006.01)

(52) U.S. Cl. ........................ 711/162; 711/161

(58) Field of Classification Search ........................ None
See application file for complete search history.

(56) References Cited

U.S. PATENT DOCUMENTS

| | | | |
|---|---|---|---|
| 7,024,527 B1 * | 4/2006 | Ohr | 711/161 |
| 7,103,740 B1 * | 9/2006 | Colgrove et al. | 711/162 |
| 7,149,787 B1 * | 12/2006 | Mutalik et al. | 709/217 |
| 2003/0172130 A1 * | 9/2003 | Fruchtman et al. | 709/219 |
| 2005/0193239 A1 * | 9/2005 | Shackelford | 714/7 |
| 2007/0271410 A1 * | 11/2007 | Shackelford | 711/100 |

* cited by examiner

*Primary Examiner*—Than Nguyen
(74) *Attorney, Agent, or Firm*—Holland & Hart

(57) ABSTRACT

Restoring data, without suspending access to the data for the entire time that the data is being restored. Access is suspended only while a portion of the data is restored, before access to all of the data is permitted. A driver virtualizes any remaining unrestored data. To accomplish this, the driver maintains a list of data yet to be restored. If a request to read a portion of the data is then received, and the requested portion is on the list, the driver restores the requested portion before permitting the read request to be fulfilled. The restored portion is then removed from the list of unrestored data. If a request to write a portion of the data is received, the write is permitted, and the location just written to is removed from the list without restoring.

20 Claims, 4 Drawing Sheets

RESTORING DATA WITH REDUCED SUSPENSION-OF-ACCESS PERIODS

BACKGROUND OF THE INVENTION

Computing technology has transformed the way we work and play. Often, the data represented on a computing system is many times more valuable than the hardware of the computing system itself. Despite the utmost care, however, data can still be lost. In order to protect against data loss, data from a computing system may be backed up to a secondary storage device such as, for example, another network location, or perhaps even an external storage device connectable directly to the computing system. In one backup environment, for example, an image of an entire disk volume may be backed up.

When restoration of the data is needed, conventional restoration technology suspends access to the data, recovers the data, and then reallows access to the data. However, sometimes the recovery of data is time-consuming, requires reboots, overwhelms available network bandwidth, or suffers from other performance limitations. This is particularly true when the amount of data to replace is large as when, for example, recovering an entire volume image over a network. When a single backup location serves as backup for multiple systems, the performance constraints can be even more frustrating.

The suspending of access represents inconvenience to the user and often results in lost productivity.

BRIEF SUMMARY OF THE INVENTION

The foregoing problems with the prior state of the art are overcome by the principles of the present invention, which are directed towards mechanisms for restoring data, without suspending access to the data for the entire time that the data is being restored. Instead, access is suspended only while a portion of the data is restored, before access to all of the data is permitted. A driver virtualizes any remaining unrestored data by making it appear to be present and mediating access to the data until direct access becomes possible.

To accomplish this, the driver understands what data is to be restored and what data has already been restored. If a request to read a portion of the data is then received, and the requested portion has not yet been restored, the driver restores the requested portion before permitting the read request to be fulfilled. If a request to write a portion of the data (and thus supercede something not yet restored) is received, the write is permitted, and the data is removed from the pending transfer list. In either the read or write case, valid data may be present in its assigned location by the time the ordinary I/O handling completes. Data not yet expressly requested may optionally be restored in the background. The driver may prioritize the restore of such unrequested data according to any reasonable standards.

Unlike conventional restore technologies, access to data is permitted before all of the data is restored. This is particularly useful where the restore would take a significant period of time and when only a subset of the restored data is likely to be accessed immediately—as when, for example, restoring a volume over a network. This allows the data to be made available more rapidly thereby reducing down time and user frustration.

Additional embodiments of the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for restoring data, without suspending access to the data for the entire time that the data is being restored. Instead, access is suspended only while a portion of the data is restored, before access to all of the data is permitted. A driver virtualizes any remaining unrestored data in a manner that is described in further detail hereinafter. To accomplish this, when the driver receives a request to read a portion of the data and that data has not yet been restored, the driver restores the requested portion before permitting the read request to be fulfilled. If a request to write a portion of the data is received, the write is permitted, and the data is eliminated from the pending transfer list without ever being restored. Data not yet requested may optionally be restored in the background. The driver may prioritize the restore of such unrequested data according to any reasonable standards.

Unlike conventional restore technologies, access to data is permitted before all of the data is restored. This is particularly important where the restore would take a significant period of time and when a small subset of the total restore data is likely to be accessed immediately (as when, for example, restoring a system volume from a backup, possibly over a network). This allows the data to be made available more rapidly thereby reducing down time, utilization of scarce transfer bandwidth, and user frustration.

First, a general computing system will be described with respect to FIG. 1, as being a suitable computing system that may be used to practice the principles of the present invention. Then, the principles of the present invention will be described with respect to FIGS. 2, 3 and 4.

Figure 1:
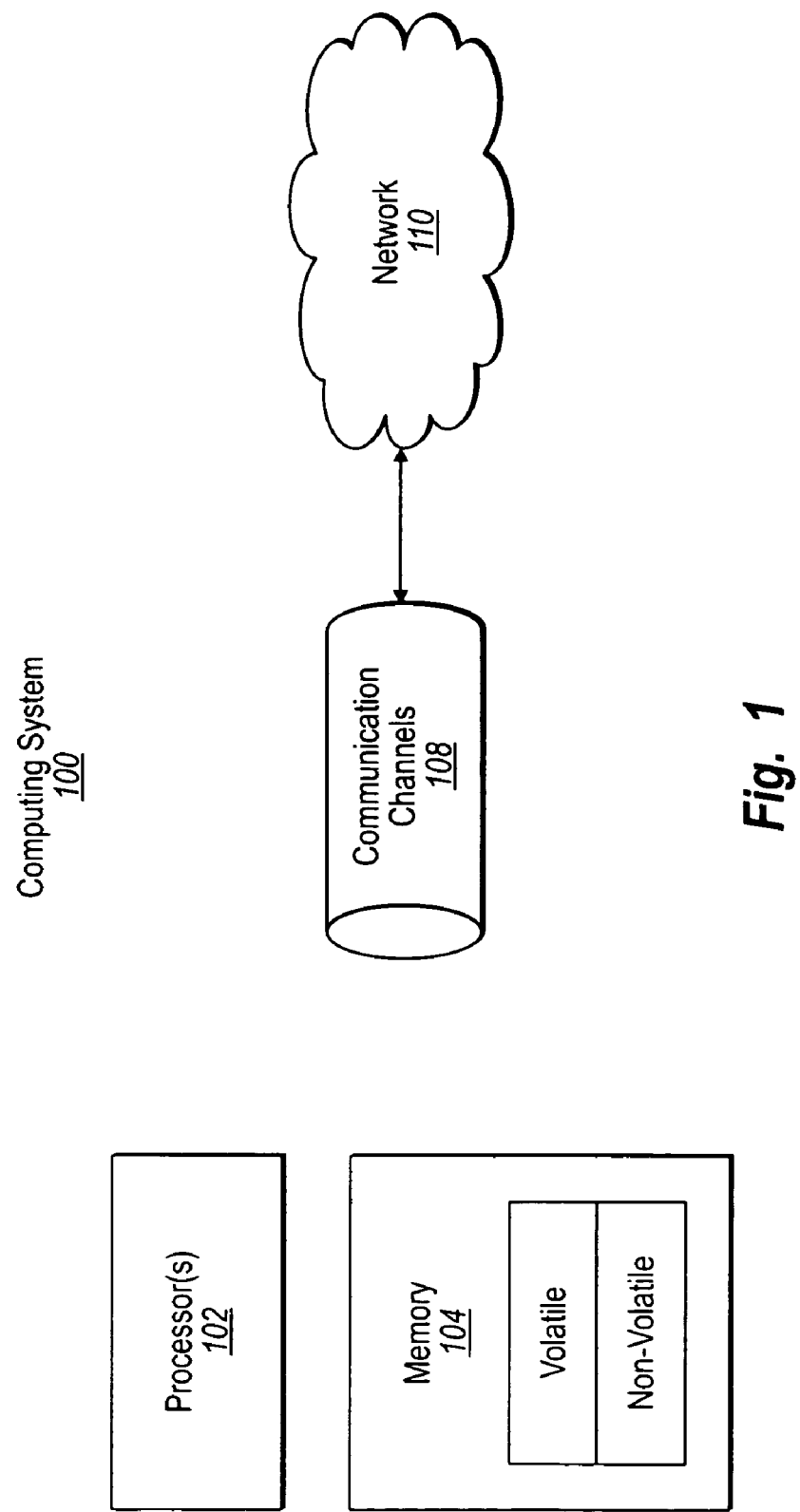
FIG. 1 illustrates a computing system that may be used to implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software in the form of a computer program product, one or more processors of the associated computing system that performs the act direct the operation of the computing system in response to having executed computer-executable instructions from one or more computer-readable media. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Note, however, that a networked environment is not a prerequisite of this invention. The source of data to be restored may be within the storage subsystem of the local machine; the techniques and methodologies comprising the invention still obtain, as do its potential benefits.

Figure 2:
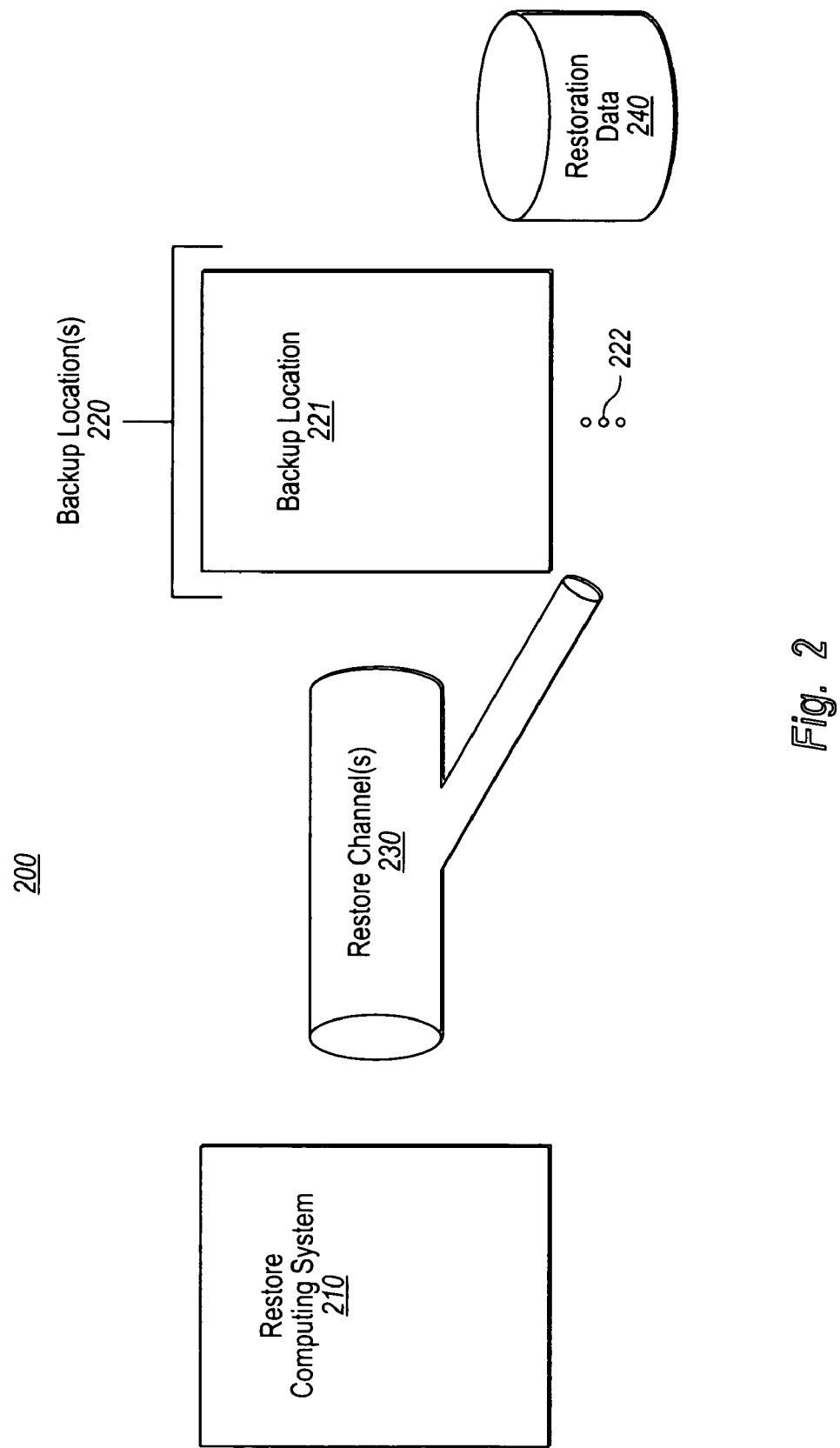
FIG. 2 illustrates an environment that includes one or more backup locations that contain restoration data to be restored to a restore computing system using one or more restore channels.

FIG. 2 illustrates an environment 200 that includes one or more backup locations 220 that contain restoration data 240 to be restored to a restore computing system 210 using one or more restore channels 230. Although not required, the restoration data 240 may be distributed over multiple backup locations including backup location 221 amongst potentially others as represented by the vertical ellipses 222. In may be useful to use multiple communication channels to communicate with the multiple backup locations. For example, some restore data may be located over a local area network, other restore data may be located on various Internet sites, and yet other restore data may be located on internal or external hard drive(s) directly connected to the restore computing system 210.

The restoration data 240 may be small or voluminous, or somewhere in-between. In a recovery environment, the restoration data 240 may be an entire volume, or a backup or image of a volume, taken from the restore computing system 210 as some prior time. Alternatively, the restoration data may include one or more files, one or more clusters regardless of the file boundaries, or one or more sectors without regard for file boundaries.

Figure 3:
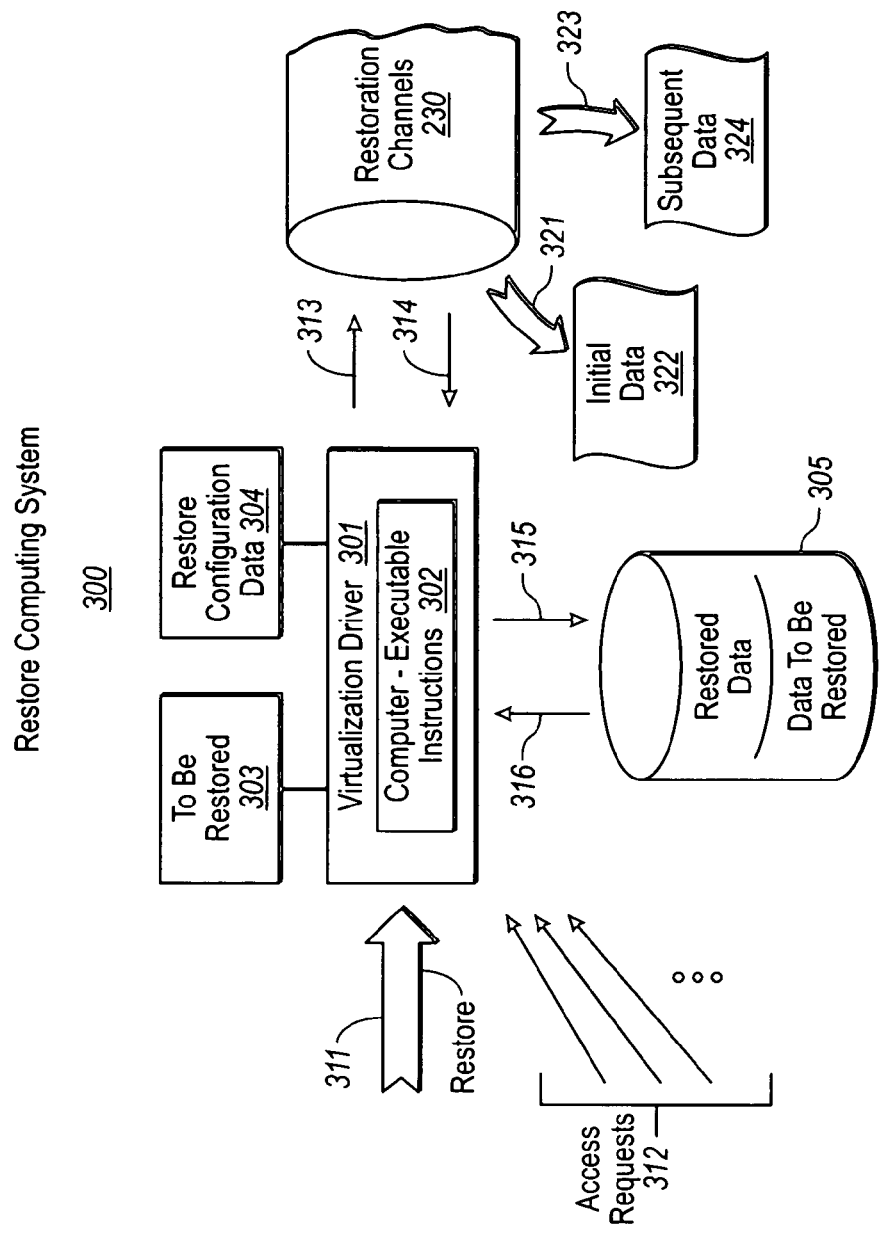
FIG. 3 illustrates a virtualization driver that may be used at the restore computing system to virtualize the restore process so that access to the data may be restored before all of the underlying data is restored.

FIG. 3 illustrates the restore computing system 210 in further detail in environment 300. The environment is illustrated as including various data structures and data flows. A possible order to the data structures will be described with respect to FIG. 4, which illustrates a flowchart of a method 400 for restoring data in accordance with the principles of the present invention. As will also be apparent from FIG. 4 and its corresponding description, not all of the data structures and modules illustrated in FIG. 4 may initially be operational. For instance, in a restore environment, the entire hard drive may have been corrupted. In that case, the virtualization driver 301 and associated data structures will not be immediately instantiated. As the method 400 of FIG. 4 may be performed in the environment 300 of FIG. 3, FIGS. 3 and 4 will now be described in an integrated manner.

Figure 4:
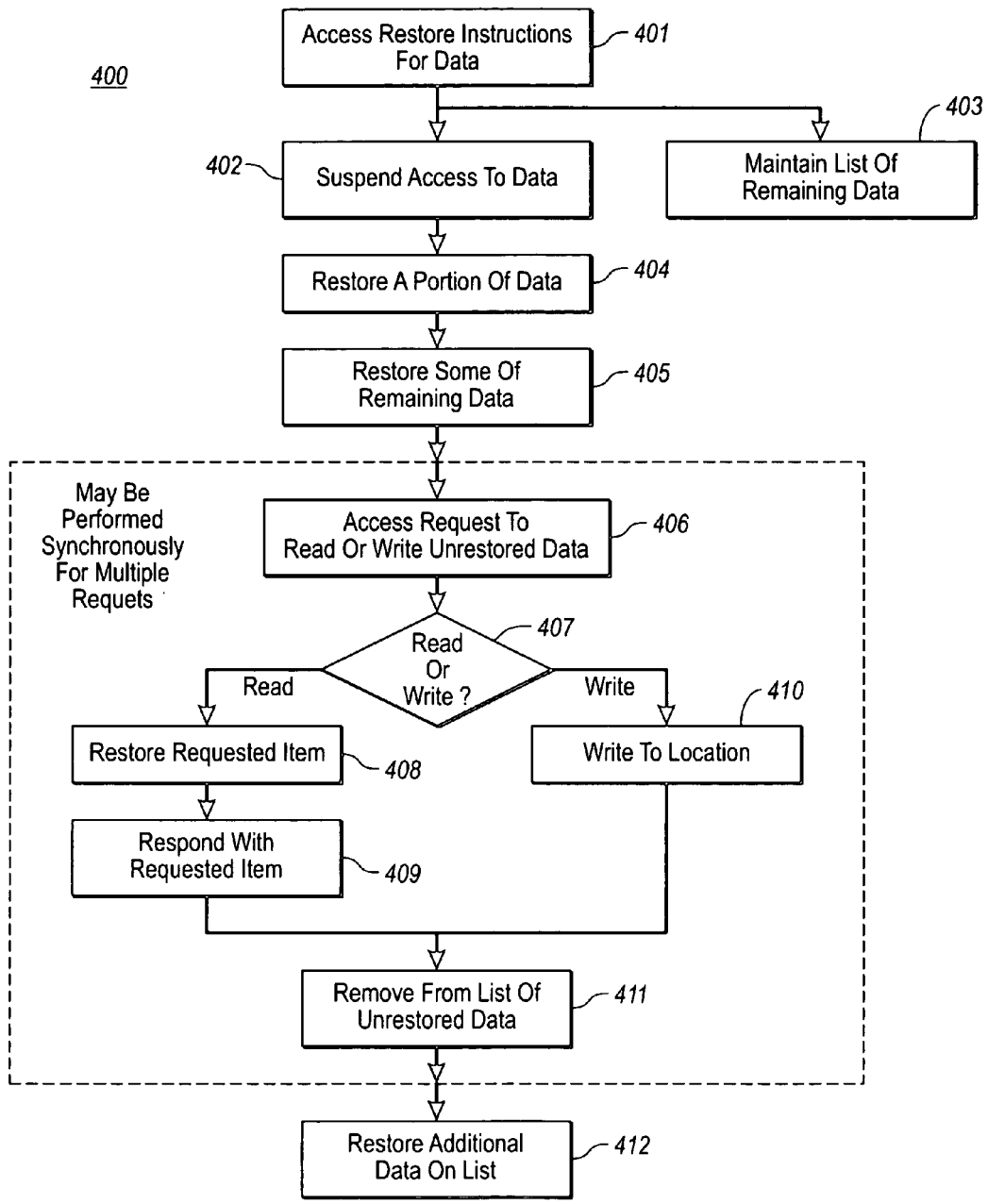
FIG. 4 illustrates a flowchart of a method for restoring data in accordance with the principles of the present invention.

Referring first to FIG. 4, the method 400 may optionally be initiated by accessing an instruction to restore the data (act 401). In FIG. 3, for example, the restore instruction 311 is received by the virtualization driver 301. In a restore environment in which the entire hard drive has been corrupted, instantiation of a functional virtualization driver 301 may not be possible. In that case, the boot operation itself may initiate the restore operation. For instance, BIOS may be configured to detect when restore is appropriate prior to booting. Alternatively, an inserted CD ROM or boot floppy may contain restore instructions that initiate the restore process.

For instance, if the restore request is to restore a file or other data that does not relate to the virtualization driver 301 or the components of the operating system needed to support the virtualization driver 301, the virtualization driver 301 may manage the restore process at this stage. If, on the other hand, the restore request is to restore an entire volume, the restore would not be managed by the virtualization driver 301 at this stage, but by the boot process generally.

Regardless of whether the restore process is, at this stage, managed by the virtualization driver or the boot process, access to the data to be restored is temporarily suspended (act 402). If the virtualization driver 301 is already instantiated, the virtualization driver 301 may also begin maintaining a list of all data that is to be restored or a list of data that is already restored (act 403). This list is represented in FIG. 3 by the "To Be Restored" list 303. That list may include any representation (including a list of data that has already been restored) from which the virtualization driver and/or boot process may identify data yet to be restored.

The restore computing system then restores only a portion of data leaving a remaining portion of the data at least temporarily unrestored (act 404). This portion of data should include at least the data needed to instantiate a virtualization driver 301 that functions as described herein, plus those components of the operating system that support the virtualization driver 301. For instance, components of the operating system needed to communicate over restore channels 230 (see FIG. 2) may be restored at this stage. Referring to FIG. 3, this initial restoration is represented by arrow 321 in which initial data 322 is provided by restoration channel(s) 230 to the restore data store 305.

From this point forward, the virtualization driver 301 may be instantiated and take over the rest of the restore operation. If the virtualization driver 301 is activated at this stage, the list 303 may be initialized to include all of the data that is requested to be restored minus the initial data 322. There is no requirement for the identity of the initial data 322. In a recovery environment, or in an environment in which there is insufficient data or software to continue with the recovery processes, however, it is most useful if the initial data 322 contain sufficient data and software to continue the rest of the recovery process.

For instance, in a recovery environment tasked with restoring a damaged machine running some form of the Windows operating system, the initial data 322 may include all of the content of the "Windows" directory. The initial data 322 may even be less than that and include only the operating system components needed to communicate over the restore channels, and instantiate the virtualization driver 301. The needed components may be evaluated for any given combination of an operating system, hardware abstraction layer, or configuration. Upon a boot operation in a recovery environment, the system evaluates its own hardware configuration, and may identify the needed initial data 322 based on a mapping of the operating system/hardware configuration to the list of needed components.

Alternatively, the operating system components needed to insert the very lowest level filter driver may be manually identified for each operating system/hardware configuration. A low level filter driver may be instantiated after that having the sole purpose of recording further I/O made before the restore channel(s) are available. The combination of the components needed to instantiate the lowest level filter driver, and the components instantiated through the subsequent I/O recorded by the driver, would then be the cumulative total of all needed components for continuing the restore process. The initial data 322 may alternatively be more than what is needed to continue the restore process.

The virtualization driver 301 operates to virtualize the restore process so that access to the data may be restored before all of the underlying data is actually restored. The virtualization driver 301 does this by filtering all incoming read and write requests, and optionally also by continuing the restore process even if there has not been a request for the additional remaining data items being restored. The virtualization driver 301 may perform prioritization such that more critical data is restored prior to less critical data. Alternatively, the virtualization driver 301 may attempt no prioritization in the case of data that has not been specifically requested, and simply restore data sequentially or in an opportunistic fashion. As part of this restore process, therefore, some of the remaining data (act 405) may be restored prior to receiving any expressed request for data (act 406). Alternatively, a just-in-time approach may be taken in which the remaining data is not restored unless expressly requested.

At some point, the virtualization driver 301 may receive a request (such as one of requests 312) to perform a read or write of unrestored data. The virtualization driver 301 may include computer-executable instructions that permit the driver to respond appropriately to virtualize the restore process such that access to the data is permitted even before all the data is restored. If the portion of the data that is to be read or written is not present in the "to be restored" list 303 (or in another possible embodiment, is present in a corresponding "already restored" list), the request is allowed to pass the virtualization driver 301, with potentially some transformation if needed to conform to the schema recognized by the lower layers that perform the read or write to and from the store 305 (as represented by arrows 315 and 316).

If the portion of the data that is to be read or written is present in the "to be restored" list (or is not present in a corresponding "already restored" list) (act 406), different action may then be taken depending on whether the request is a read request or a write request (decision block 407).

If the requested action is to read data ("Read" in decision block 407), the virtualization driver 301 restores at least the requested portion of the remaining data in response to the request (act 408). In FIG. 3, for instance, the virtualization driver 301 requests 313 the data, and receives 314 the data over the restore channel(s). The virtualization driver 301 may use a restore configuration list 304 to identify any procedures, addresses or configuration needed to restore the requested data over the appropriate restore channels. For instance, the configuration may include a URL for an Internet or network location, and may specify any credentials needed to access the appropriate data, and potentially where to find those credentials. This restore is represented more abstractly by the communication channel(s) providing 323 subsequent data 324 to the local store 305. The read request is then passed by the virtualization driver 301, causing the requested data to be read (act 409). The restored data is then removed from the "to be restored" list 303 (act 411) (or equivalently is added to the "already restored" list).

If the requested action is to write data ("Write" in decision block 407), the write request is permitted to pass the virtualization driver 301 (with potentially some transformation) causing the data to be written to the appropriate location (act 410). The corresponding location is then removed from the "to be restored" list 303 (act 411) (or equivalently is added to the "already restored" list).

This process may be repeated at any time whenever a request to read or write data is received by the virtualization driver. After any given request is satisfied in this way, the virtualization driver may continue through the restore by restoring more of the remaining data (act 412) with or without a request for that data.

As previously mentioned, the virtualization driver may take a just-in-time approach in which the remaining data is restored only when and if requested. Alternatively, the virtualization driver may satisfy any request as a top priority, but then continue the restore of unrequested data blocks in the background so long as it does not interfere with the user experience, and all pending requests have been met. This restore environment permits for data to be restored to a storage that is smaller than the restoration data. In that case, data may be restored until the storage is full. Then, data may be paged from the backup location as needed to service any pending requests. The storage should, however, be able to accommodate at least the initial data 322.

Accordingly, since not all of the data needs to be physically restored prior to restoring access to the data, the amount of time elapsed during suspension of access to the data may be significantly reduced; usage of network or local bus bandwidth to get the point where access resumes is also minimized. This allows for reduced down-time and improved user experience during a restore operation, particularly where large amounts of data are to be restored, as in a recovery environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for restoring data comprising:
   an act of restoring only an initial portion of data, leaving a remaining portion of the data at least temporarily unrestored;
   after the act of restoring only an initial portion of data, an act of accessing a request to read a portion of the remaining unrestored data;
   an act of restoring at least the requested portion of the remaining data in response to the request;
   an act of responding to the request by providing access to the requested portion after the act of restoring at least the requested portion; and
   an act of restoring more of the remaining data after the act of responding;
   wherein the initial portion of data comprises data for instantiating a virtualization driver.

2. A method in accordance with claim 1, further comprising:
   an act of accessing an instruction to restore the data to thereby cause the act of restoring only an initial portion of data.

3. A method in accordance with claim 2, further comprising:
   an act of suspending access to data in preparation for the act of restoring only an initial portion of data and in response to the act of accessing the instruction.

4. A method in accordance with claim 1, further comprising:
   an act of restoring some of the remaining data before the act of accessing a request to read the portion of the remaining data.

5. A method in accordance with claim 4, wherein the act of restoring some of the remaining data occurs in response to one or more other requests.

6. A method in accordance with claim 4, wherein the act of restoring some of the remaining data occurs automatically without additional requests.

7. A method in accordance with claim 1, wherein the data is a volume.

8. A method in accordance with claim 1, wherein the data is one or more files.

9. A method in accordance with claim 1, wherein the data is a plurality of sectors or clusters of memory.

10. A method in accordance with claim 1, wherein the requested portion of the remaining data is at least one file.

11. A method in accordance with claim 1, wherein the requested portion of the remaining data is at least one cluster of disk storage.

12. A method in accordance with claim 1, wherein the requested portion of the remaining data is at least one sector of disk storage.

13. A method in accordance with claim 1, further comprising:
   an act of maintaining a list of the remaining data that is yet to be restored.

14. A method in accordance with claim 13, further comprising:
   an act of receiving a request to write to a location corresponding to at least a portion of the remaining data in the list;
   an act of writing to the location; and
   an act of tracking that the location does not need to be restored.

15. A method in accordance with claim 1, wherein the request is a first request, the requested portion of the remaining data is a first requested portion of the remaining data, the method further comprising the following after an act of restoring at least the first requested portion of the remaining data:
   after the act of restoring the first requested portion of the remaining data, an act of accessing a second request to read a second portion of the remaining unrestored data;
   an act of restoring at least the second requested portion of the remaining data in response to the second request; and
   an act of responding to the second request by providing access to the second requested portion after the act of restoring at least the second requested portion.

16. A computer program product comprising one or more computer-readable media having thereon computer-executable instructions that, when executed by one of more processors of a computing system, cause the computing system to perform a method for restoring data, the method comprising:
   an act of restoring only an initial portion of data, leaving a remaining portion of the data at least temporarily unrestored;
   after the act restoring only an initial portion of data, an act of accessing a request to read a portion of the remaining unrestored data;
   an act of restoring at least the requested portion of the remaining data in response to the request;
   an act of responding to the request by providing access to the requested portion after the act of restoring at least the requested portion; and
   an act of restoring more of the remaining data after the act of responding;
   wherein the initial portion of data comprises data for instantiating a virtualization driver.

17. The computer program product in accordance with claim 16, wherein the one or more computer-readable media are physical storage media.

18. The computer program product in accordance with claim 17, wherein the one or more computer-readable media are system memory.

19. One or more computer-readable media having thereon the following:
   a list of data to be restored in response to a request to restore data;

computer-executable instructions that, when executed by one or more processors of a computing system, cause the computing system to perform the following:

an act of restoring only an initial portion of data, leaving a remaining portion of the data at least temporarily unrestored;

after the act of restoring only an initial portion of data, an act of accessing a request to read a portion of the remaining unrestored data;

an act of restoring at least the requested portion of the remaining data;

an act of responding to the request by providing access to the requested portion after the act of restoring at least the requested portion; and an act of removing the requested portion from the list of data to be restored;

wherein the initial portion of data comprises data for instantiating a virtualization driver.

20. The one or more computer-readable media in accordance with claim 19, wherein the one or more computer-readable media are system memory.

* * * * *